United States Patent
Day et al.

(10) Patent No.: US 6,444,407 B1
(45) Date of Patent: Sep. 3, 2002

(54) PLATE FOR LIQUID CRYSTAL DISPLAY, METHOD AND POLYMERIC COMPOSITIONS

(75) Inventors: Richard A. Day, Whitney Point, NY (US); Ramesh R. Kodnani, Binghamton, NY (US); Konstantinos I. Papathomas, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 09/603,197

(22) Filed: Jun. 26, 2000

(51) Int. Cl.$^7$ ............................................. G02F 1/1335
(52) U.S. Cl. ...................................... 430/321; 349/110
(58) Field of Search ...................... 430/321, 7; 349/110

(56) References Cited

U.S. PATENT DOCUMENTS

| | | | |
|---|---|---|---|
| 4,390,614 A | 6/1983 | Peck et al. ................... | 430/252 |
| 4,420,552 A | 12/1983 | Peck et al. ................... | 430/252 |
| 4,837,097 A | * 6/1989 | Narang et al. ................. | 430/5 |
| 5,256,442 A | 10/1993 | Kawakami .................... | 427/96 |
| 5,444,108 A | 8/1995 | Hagquist et al. ............. | 523/455 |
| 5,619,357 A | 4/1997 | Angelopoulos et al. ..... | 349/110 |
| 5,780,201 A | 7/1998 | Sabnis et al. ............ | 430/270.1 |
| 6,045,607 A | 4/2000 | Breton et al. ............ | 106/31.29 |

* cited by examiner

Primary Examiner—John A. McPherson
(74) Attorney, Agent, or Firm—Connolly Bove Lodge & Hutz; Lawrence R. Fraley

(57) ABSTRACT

Plates that are especially suitable for use in liquid crystal display structures comprising a transparent substrate; a dark mesh material on the substrate having a thickness of about 1 to about 30 microns; wherein the dark mesh material comprises a photocured photoimageable organic polymeric composition and a coloring agent; and wherein the dark mesh material has an optical density of about 0.5 to about 3 in the visible light range; and a polarizing layer are provided along with methods for their fabrication.

26 Claims, 2 Drawing Sheets

PLATE FOR LIQUID CRYSTAL DISPLAY, METHOD AND POLYMERIC COMPOSITIONS

TECHNICAL FIELD

The present invention is concerned with flat panel displays and particular liquid crystal displays (LCDs). More especially, the present invention relates to cover plates and/or back plates suitable for use in flat panel displays. In particular, the present invention is directed to the use of certain polymer compositions as the black matrix polymer layer of the plate. The polymer compositions employed in the present invention make it possible to lower the film thickness of the black matrix polymer layer without compromising the optical density. The present invention also relates to polymeric compositions. In addition, the present invention relates to liquid crystal displays employing the cover and/or back plates of the present invention.

BACKGROUND OF THE INVENTION

Plates for liquid crystal display structures include a flat glass plate having a black matrix layer in a grid or mesh pattern located thereon. The mesh or grid pattern in the case of a cover plate is typically filled with an optical diffusion layer in the form of a translucent coating. Laminated onto the structure is a polarizer. To fabricate a liquid crystal display, liquid crystal panel or tile(s) are adhesively bonded to the cover plate and back plate.

A current method for fabricating the black matrix glass plate for various LCDs comprises the screening of a photosensitive dielectric on a flat glass plate about 1.1 mm thick and subsequent imaging the grid pattern using a photomask. Typical thicknesses of the dielectric used are 35–50 microns. The next step in the case of a cover plate involves coating and filling the pattern with the diffuser (a translucent coating). Following this, a polarizer is laminated onto the structure such as by rolling or autoclaving.

However, entrapment of air bubbles has been observed during this process. Air pockets provide areas for subsequent delamination, scattering of light and reliability concerns. As the size of the liquid crystal display increases, this problem becomes more pronounced.

Accordingly, these structures could withstand improvement.

SUMMARY OF THE INVENTION

The present invention addresses problems discussed above. In particular, the present invention provides a high contrast ink composition and makes it possible to obtain cover and/or back plate with a planar dark matrix structure free from entrapped air.

Compositions of the present invention exhibit increased opacity. This makes it possible to achieve the same optical density but at significantly thinner coatings.

In particular, the present invention relates to a plate comprising:
 a transparent substrate;
 a dark mesh material on the substrate having a thickness of about 1 to about 30 microns;
 wherein the dark mesh material comprises a photocured photoimageable organic polymeric composition and about 0.01 to about 6 percent by weight of a coloring agent selected from the group consisting of organic dyes, organic pigments and inorganic dyes based upon the total of the polymeric composition and coloring agent; and wherein the dark mesh material has an optical density of about 0.5 to about 3 in the visible light range; and
 a polarizing layer.

Another aspect of the present invention relates to a method for fabricating a plate structure. The method comprises applying a photoimageable composition to a transparent substrate at a thickness of about 1 to about 30 microns wherein the photoimageable composition comprises an organic polymeric composition and about 0.01 to about 6 percent by weight of a coloring agent selected from the group consisting of organic dyes, organic pigments and inorganic dyes based upon the total of the polymeric composition and coloring agent; and wherein the composition has an optical density of about 0.5 to about 3 in the visible light range;
 exposing the composition to actinic radiation and developing to provide a mesh structure; and
 placing a polarizer on the structure.

The present invention also relates to a liquid crystal display which comprises at least one liquid crystal display tile bonded to the above disclosed plate of the present invention.

The present invention also relates to preferred compositions employed according to the present invention. The preferred compositions comprise a photosensitive liquid epoxy acrylate; hardener; and about 0.01 to about 6 percent by weight of an organic black pigment-metal complex.

Still other objects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

DETAILED DESCRIPTION OF THE INVENTION

Figure 1:
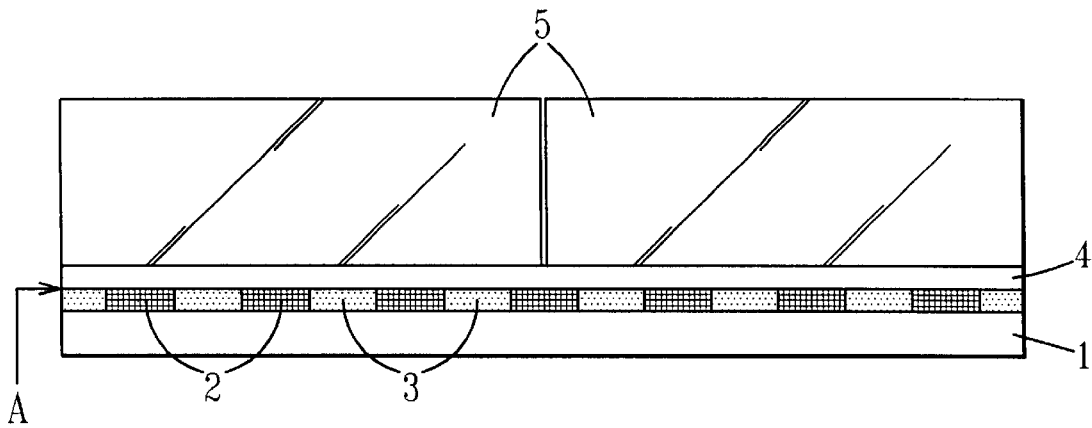
FIG. 1 is a schematic diagram of a tiled liquid crystal display employing a cover plate and dark mesh material of the present invention.

In order to facilitate an understanding of the present invention, reference will be made to the drawings and more particularly to FIG. 1, where there is shown a cross-section of the top transparent substrate 1, such as glass and the dark mesh material 2 according to the present invention.

The black mesh material is a photosensitive dielectric coating and comprises a photoimageable organic polymeric material and about 0.01 to about 6 percent by weight of a dye based upon the total weight of the organic polymeric material and dye.

Typical photoimageable polymers employed according to the present invention include compositions containing a polyolefinically unsaturated component including, for example, an epoxy, cyanate ester resin and/or combinations thereof and a polyolefinically unsaturated monomer.

Preferred polyolefinically unsaturated components include trimethylolpropane trimethacrylate, triethylolpropane triacrylate, dipentaerythritol pentaacrylate, pentaerythritol triacrylate, ethoxylated trimethylolpropane triacrylate, 1,6-hexanediol diacrylate, neopentyl glycol diacrylate, pentaerythritol tetraacrylate, and 1,3-butylene glycol diacrylate. Preferred monoacrylates include cyclohexylacrylate, 2-ethoxyethyl acrylate, 2-methoxy acrylate, benzoyl acrylate, and isobornyl acrylate. Such compounds are available from a variety of sources, for example, a preferred polyacrylate, dipentaerythritol monohydroxypentaacrylate, is available as SR 399 from Sartomer Co.

Epoxy resins useful in the present compositions of the present invention include polyepoxides curable at elevated temperature. Examples of these polyepoxides include polyglycidyl and poly(b-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acylic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcinol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrabis(4-hydroxyphenyl)ethane, 2,2-bis(4-hydroxyphenyl)propane, 2,2-bis(3,5-dibromo-4-hydroxyphenyl)propane, and novolaks formed from the combination of aldehydes, such as formaldehyde, acetaldehyde, chroral, and furfuraldehyde, with phenols, such as phenol itself, and phenols substituted on the ring by chlorine atoms or by alkyl groups each containing up to nine carbon atoms such as 4-chlorophenol, 2-methylphenol, and 4-tbutylphenol.

Poly(N-glycidyl) compounds include, for example, those obtained by dehydrochlorination of the reaction products of epichlorohydrin with amines containing at least two amino hydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Such epoxies are available from a variety of commercial sources, such as the Epon series from Shell Chemical Co., the Epirez series from Rhone-Poulenc, and Araldite series from Ciba, and the DER series from Dow Chemical Co.

Also useful are halogenated epoxy resins such as the brominated epoxides available from the sources shown above. Halogenated epoxy resins in combination with other fire retardant materials may be suitable for use as fire retardant additives in the compositions of the present invention.

Especially preferred epoxy resins useful in the present invention are the glycidyl ethers of bisphenol A marketed under the tradenames Epon 825, Epon 1001 and Epon 828 available from Shell Chemical Co., DER 331 and 332 available from Dow Chemical Co. and the cycloaliphatic epoxy resin marketed as ERL-4221 and ERL-4299 by Union Carbide Co.

Various epoxies such as the glycidyl ethers marketed as the EPODIL series by Pacific Anchor Chemical Corporation, a division of Air Products and Chemicals Inc., may be added as epoxy diluents, to reduce the viscosities of the resins of the present invention.

Epoxy compounds are included in the resin compositions of the invention in an amount of from about 25 to 70% by wt., preferably from about 30 to 60% by wt.

Acid anhydrides can be also used as hardening components for the thermosetting component of the compositions. Typical examples of acid anhydrides include anhydrides such as maleic anhydride, succinic anhydride, itaconic anhydride, phthalic anhydride, tetrahydrophthalic anhydride, hexahydrophthalic anhydride, methylhexahydrophthalic anhydride, endomethylene tetrahydrophtoalic anhydride, methylendomethylenene tetrahydrophthalic anhydride, chlorendic anhydride, and methyltetrahydrophthalic anhydride, aromatic polycarboxylic anhydrides such as trimellitic anhydride, pyromellitic anhydride, and benzophenone-tetracarboxylic dianhydride; and polycarboxylic anhydride derivatives such as 5-(2,5-dioxotetrahydrofuryl)-3-methyl-3-methyl-3-cyclohexene-1,2-dicarboxylic anhydride.

A photoinitiator may be added to the composition in an amount effective to respond to the actinic radiation and to initiate and induce curing of the associated resin, via substantial polymerization thereof. Suitable photoinitiators useful with ultraviolet (UV) actinic radiation curing mono- and polyolefinic monomers include free radical generating UV initiators such as benzophenone and substituted benzophenones, acetophenone and substituted acetophenones, benzoin and its alkyl esters and xanthone and substituted xanthones. Preferred photoinitiators include diethoxy-acetophenone, benzoin methyl ether, benzoin ethyl ether, benzoin isopropyl ether, diethoxyxanthone, chlorothio-xanthone, azo-bisisobutyronitrile, N-methyl diethanolaminebenzophenone, and mixtures thereof.

Visible light initiators include camphoroquinone peroxyester initiators and 9-fluorene carboxylic acid peroxyesters. Particularly preferred photoinitiators include 2-hydroxy-2-methyl-1-phenyl-propan-1-one available as Darocur 1173 from EM Industries, Inc., and 2-benzyl-2-(dimethylamino)-1-[4-(4-morpholinyl)phenyl]-1-butanone available as Irgacure 369 and Irgacure 261 from Ciba.

The photocurable and thermosetting resin composition may incorporate one or a mixture of two or more of well-known epoxy resin curing accelerators or hardening promoters. Examples of the epoxy resin curing promoters include, but note limited to, imidazole and imidazole derivatives, such as 2-methylimidazole, 2-ethylimidazole, 2-ethyl-4-methylimidazole, 2-phenylimidazole, 4-phenylimidazole, 1-cyanoethyl-2-phenylimidazole, and 1-(2-cyanoethyl)-2-ethyl-4-methylimidazole; guanamines such as guanamine, and benzoguanamine; and amino compounds such as dicyandiamide, benzyldimethyl amine, 4-(dimethylamino)-N,N-dimethylbenzyl amine, 4-methoxy-N,N-dimethylbenzyl amine, 4-methyl-N,N-dibenzyl amine, and melamine. The amount of the accelerator to be incorporated in the composition is in the range of from 0.01 to 10.0 parts by weight based on 100 parts by weight of the photoactive polymer matrix.

The cyanate ester component comprises at least one cyanate ester compound (monomer, oligomer, or polymer). Preferably, the cyanate ester component comprises at least one cyanate ester compound (monomer, oligomer, or polymer). Preferably, the cyanate ester component comprises at least one compound having two or more—OCN functional groups per molecule. The molecular weights of the useful cyanate ester compounds are typically in the range of about 150 to 2000. The cyanate esters useful in the invention may be employed in amounts ranging from about 25% by wt. to about 50% wt. The cyanate ester component may be present as a single cyanate ester, preferably including at least one dicyanate ester. Preferred cyanate esters useful in the present invention include polyaromatic cyanate esters, such as the dicyanate esters of bisphenols. Especially preferred cyanate esters include the dicyanate esters of bisphenol A, such as the AroCy B-10 cyanate ester monomer, the dicyanate esters of tetramethyl bisphenol F, such as AroCy M-10, and the dicyanate esters of bisphenol E, such as AroCy L-10, all available from Ciba. Alternatively, a semisolid dicyanate oligomer of bisphenol A may be employed in conjunction with a cyanate ester of lower viscosity. An especially preferred cyanate ester oligomer is the dicyanate oligomer of bisphenol A, such as the AroCy B-30semisolid resin available from Ciba.

Catalysts useful in the present invention may also include heat activated catalysts capable of accelerating curing of the cyanate resin component. Examples of such catalysts include organo-metal compounds such as lead naphthenate, lead stearate, zinc naphthenate, zinc octylate, tin oleate, stannous laurate, dibutyltin maleate, manganese naphthenate, cobalt naphthenate, acetylacetonate iron, etc.; inorganic metal salts such as $SnCl_3$, $ZnCl_2$, $AlCl_3$, etc.; phenolic compounds such as phenol, xylenol, cresol, resorcinol, catechol, fluoroglycine, etc.; and solutions of an organo-metal component, including one or more organo-metal compounds, in a phenolic component.

In this preferred embodiment, the organo-metal component may be present in an amount of from about 0.01% to about 6% of the resin composition. The phenolic component may be present in the resin composition in amounts ranging from about 0.5 to about 10% by weight.

Preferred organo-metal salts include copper(III) acetyl acetonate, copper(II) naphthenate, cobalt(II) acetylacetonate, zinc(II) naphthenate, zinc(II) ethylhexanoate, manganese(II) naphthenate, and cyclopentadienyl iron(II) dicarbonyl dimer. Each of these organo-metal salts is readily available from various sources, for example Strem Chemical Corp., Newburyport, Mass. Other preferred organo-metal salts include dibutyltin(IV) dilaurate, available form Atochem North America, Inc., Buffalo, N.Y.

Preferred phenolic compounds include nonyl phenol, bisphenol A, cresol, phenol, and catechol, each of which is readily available from various sources, including Aldrich Chemical Co., Milwaukee, Wis.

A preferred polymer is PSR4000-CF, an epoxy acrylate liquid photoimageable solder mask. A hardener is typically admixed with the epoxy acrylate such as CA 40. A typical ratio being 10 parts of epoxy acrylate and 4 parts of the hardener.

Other examples of commercially available liquid photoimageable materials include:

DSR3241 made by Enthone/OMI.

Probimer 77 made by Ciba Specialty Chemicals.

Elpemer SD 2467 made by Lackwerke Peters.

Additionally, cationic and free radical initiated photosensitive coatings can also be used, for example Amoco Ultradel 5106 photosensitive polyimide.

The dye can be an organic dye, organic pigment and/or an inorganic dye. A preferred dye is Orasol Black RLI, a 1:2 organic pigment-chrome complex, available from Ciba-Geigy. Other dyes include those specified from the color index of Solvent Black 3 to Solvent Black 47, more particularly Solvent Black 35 (Zapon Black X50, BASF), Solvent Black 27 (Zapon Black X51, BASF), Solvent Black 3 (Neptun Black X60, BASF), Solvent Black 5 (Flexo Black X12, BASF), Solvent Black 7 (Neptun Black NB X14, BASF), Solvent Black 46 (Neptun A Black X17, BASF), Solvent Black 47 (Neopin Black X58, BASF), Solvent Black 28 (Orasol Black CN, Ciba-Geigy), Solvent Black 29 (Orasol Black RL, Ciba-Geigy), and Solvent Black 45 (Savinyl Black RLS, Sandoz Corp.).

The compositions employed in the present invention have optical densities of about 0.5 to about 3 and preferably about 1.5 to about 2.5 in the visible light range (400 to 700 nanometers). The reflectivity of the coating is typically less than 10% and preferably less than 7%.

The coating is employed at thicknesses of about 1 to about 30 microns and preferably about 9 to about 11 microns.

The compositions may also contain, depending on the properties, a filler such as barium sulfate, magnesium silicate, silicon dioxide, talc, clay, calcium carbonate, silica, bentonite, kaolin, glass fiber, carbon fiber, and mica; and or a flexibilizer for increased fracture resistance. These tougheners include: rubbers or elastomers, either as discrete particles or reacted with epoxy resin, epoxy functionalized flexibilzers, engineering thermoplastics, and amine or hydroxy-terminated thermoplastic oligomers.

Useful flexibilizers include but are not limited to: 1,4-butane-diol diglycidyl ethers (such as SHELL HELOXY MODIFIER 67), neopentlyglycol diglycidyl ether (such as SHELL HELOXY MODIFIER 67), neopentlyglycol diglycidyl ether (such as SHELL HELOXY MODIFIER 107), trimethylol ethane triglycidyl ethers (such as SHELL HELOXY MODIFIER 44), dibromoneopentylglycol glycidyl ethers (such as SHELL HELOXY MODIFIER 56), propoxylated glycerol polyglycidyl ether (such as SHELL HELOXY MODIFIER 84), polypropylene glycol glycidyl ether (such as SHELL HELOXY MODIFIER 32), polyglycidyl ether of castor oil (such as SHELL HELOXY MODIFIER 505), dimer acid diglycidyl esters (such as SHELL HELOXY MODIFIER 71), resorcinol diglycidyl ether (such as SHELL HELOXY 69), epoxidized propylene glycol dioleates (such as ELF ATOCHEM VIKOFLEX 5075), epoxy esters (ELF ATOCHEM VIKOFLEX 4050), 1,2-tetradecane oxides (such as ELFATOCHEM VIKOFLEX 14), internally epoxidized 1,3-butadiene homopolymers (such as ELF ATOCHEM POLY BD 600 and POLY BD 605), diglycidyl ether, glycidyl glycidate, bis(2,3-epoxy-2-methylpropyl)ether, and polyglycoldiepoxides (such as DOW Chemical DER 732 and DER 736). Flexible molecules which contain two or more hydroxy groups are also useful as tougheners for this invention. These flexible polyol compounds also contain long aliphatic groups. Useful polyols include E-caprolactone triol (such as UNION CARBIDE TONE 0301, 0305, 0310).

Elastomers or rubbers may also be used. Examples of these materials include, but are not limited to, the copolymers of styrene, butadiene, and ethylene or styrene, butylene, and ethylene (such as SHELL KRATON rubber), butadiene, styrene copolymers, copolymers of butadiene and styrene, butyl rubber, neoprene rubber, and poly (siloxanes). Functionalized versions of these materials such as carboxyl terminated poly (n-butylacrylate) rubber are particularly useful. Epoxy resin monomers may be reacted with these materials to form a epoxy terminated elastomers which are useful as tougheners. Maleic anhydride terminated KRATON rubber (such as SHELL Chemical-FG 1901X), and epoxy functionalized liquid KRATON rubbers (such as SHELL Chemical-EXP-206 and EKP-207) are especially useful as tougheners.

If present, the flexibilizers are employed in amounts of about 3 to about 25% wt. If present, the filler can be included in amounts of about 0.5 to about 20% wt.

The compositions are typically applied as liquid in an organic solvent. Examples of the organic solvents include, but are not limited to, ketones such as methyl ethyl ketone and cyclohexanone; aromatic hydrocarbons such as toluene, xylene, and tetramethyl benzene; glycol ethers such as diethylene glycol monoethyl ether and dipropylene glycol diethyl ether; esters such as ethyl acetate, butyl acetate, butyl cellosolve acetate, and carbitol acetate; aliphatic hydrocarbons such as octane and decane; and petroleum solvents such as petroleum ether, petroleum naphtha, and solvent naphtha. Among the organic solvents mentioned above, ketones, glycol ethers, esters and petroleum solvents may be the most desirable from a toxicity and solubility of the dyes and pigments in the polymer solution.

The organic solvents are used for the dissolution of the photosensitive prepolymer, diluting the composition, allowing the composition to be applied in the form of a liquid, enabling the applied layer of the composition to form a film by the pre drying, and allowing the film to be exposed to light by the so-called "contact exposure".

In a preferred embodiment, about 30 grams of orasol black RLI is mixed in about 105 grams of a ketone solvent such as methyl ethyl ketone to form a uniform solution and is subsequently shear mixed in part A of PSR-4000 to obtain a uniform mixture. Shearing of about 15–30 minutes is usually employed. Next, the hardener portion of the composition is admixed.

The composition is then typically applied by screen printing.

The composition can then be partially baked, typically at temperatures of about 40° C. to about 100° C., to form a tack free dry film.

The composition can then be imagewise exposed and developed. For instance, such is exposed to radiation, such as ultraviolet, x-ray, ion-beams, and electron beams. Typical parameters of the exposure are as follows.

Actinic radiation is preferably electromagnetic radiation having a wavelength of about 700 nm or less which is capable, directly or indirectly, of curing the specified resin component of the resin composition. By indirect curing in this context is meant curing under such electromagnetic radiation conditions, as initiated, promoted, or otherwise mediated by another compound.

After exposure to actinic light, the coating is developed by removing more soluble areas. The exposed region is less soluble than the non-exposed regions. Developing of the pattern can be accomplished by immersing or spraying the film with a suitable solvent. Some suitable solvents include basic compositions such as a 1% $Na_2CO_3$ aqueous solution at about 30° C. for about 20 to about 30 seconds. The developing solution is sprayed on the film at pressures of about 30–50 psi.

The composition is then baked at temperatures of about 270° F. to 350° F. for 40 minutes to 2 hours, more preferably at 300° F. for about 1 hour.

Good robust grids have been demonstrated on a large glass format using the coatings of the present invention. This allows achieving the same optical density at significantly thinner coatings. The advantage of this is that the processing of the grid for cover and back plates which has been established remains the same.

Optical diffuser material 3 is coated and cured in the dark mesh pattern on the transparent substrate. The diffuser material may include Da-Lite Screen Co., Inc., Warsaw, IN "video vision screen", or "DA-WA screen". These screens are made of glass particles in a polymer suspension (e.g. fine crushed glass particles in an epoxy). The diffuser material can be filled in between the black mesh by a screening process. The diffuser material 3 can be filled in as a liquid and then cured.

Adding the optical diffuser material 3 on the thin dark mesh 2 as a liquid allows a smooth surface to be created for the polarizer 4.

The polarizer 4 is applied thereby forming a substantially flat or planar surface. The polarizer is preferably laminated, using a hot roll laminator.

The present invention in this embodiment addresses the problem of air entrapment at the interface identified as A between the dark mesh 2 and polarizer 4. Liquid crystal display tiles 5 are adhesively bonded to the cover plate adjacent the polarizer 4.

Figure 2:
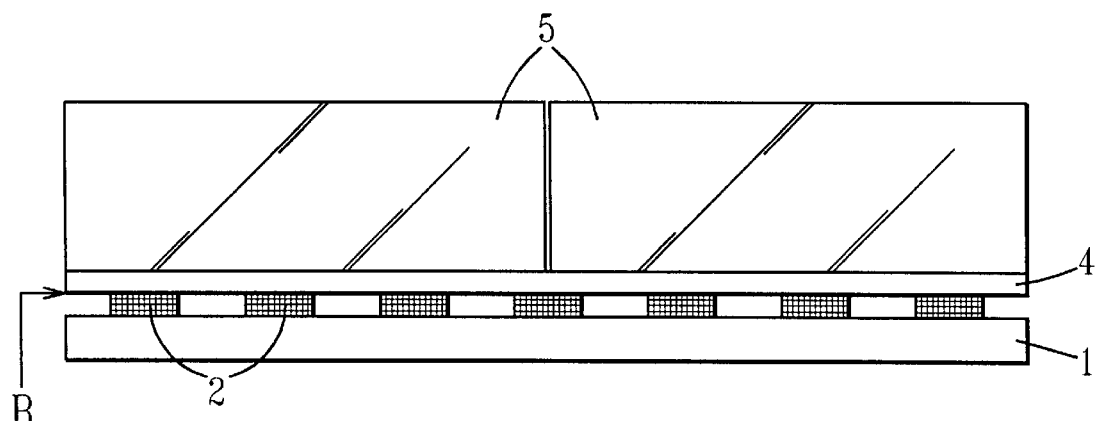
FIG. 2 is a schematic diagram of a tiled liquid crystal display employing another embodiment of a cover plate and dark mesh material of the present invention.

FIG. 2 illustrates a further embodiment of the present invention where there is shown a cross-section of the transparent substrate 1 and the dark mesh material 2 according to the present invention. A polarizer 4 is applied on the dark mesh material 2. The present invention in the embodiment addresses the problem of air entrapment identified as B at the interface between the dark mesh 2 and polarizer 4. In this embodiment, diffuser material is not provided in the openings of the mesh material. If desired, a diffuser screen can be provided elsewhere on the structure.

Liquid crystal display tiles 5 are adhesively bonded to the cover plate adjacent polarizer 4.

Figure 3:
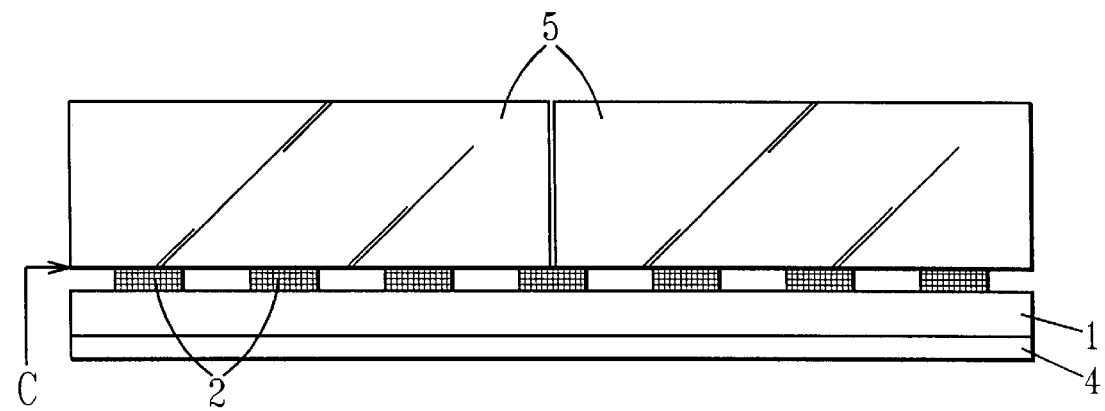
FIG. 3 is a schematic diagram of a tiled liquid crystal display employing a still further embodiment of a cover plate and dark mesh material of the present invention.

FIG. 3 illustrates another embodiment of the present invention where there is shown a cross-section of the transparent substrate 1 and the dark mesh material 2 according to the present invention located on one of the major surfaces of the substrate 1. A polarizer 4 is applied to the other major and opposite surface of the substrate 1. Liquid crystal display tiles 5 are adhesively bonded to the cover plate adjacent the dark mesh material 2.

The present invention in this embodiment addresses the problem of air entrapment identified as C at the interface between the dark mesh material 2 and liquid crystal display tiles 5.

In this embodiment, diffuser material is not provided in the openings in the mesh material. If desired, a diffuser screen can be located elsewhere on the structure.

Figure 4:
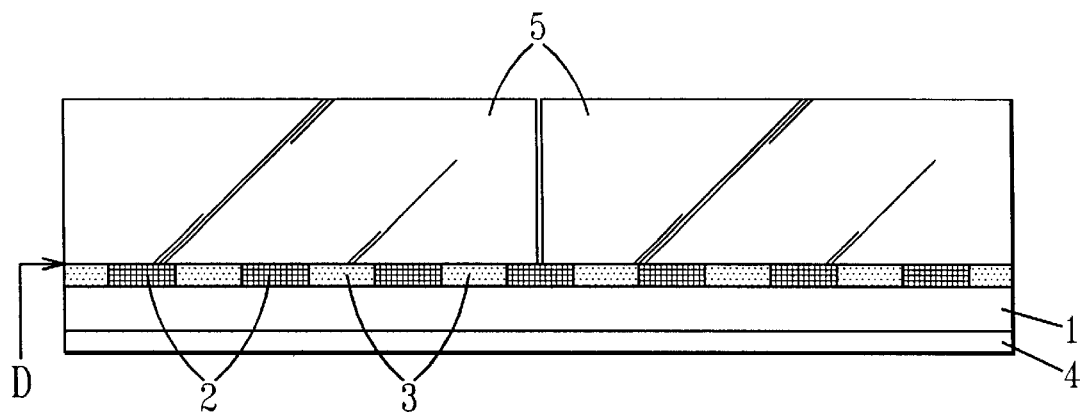
FIG. 4 is a schematic diagram of a tiled liquid crystal display employing another embodiment of a cover plate and dark mesh material of the present invention.

FIG. 4 illustrates a further alternative embodiment of the present invention where there is shown a cross-section of the transparent substrate 1 and dark mesh material 2 according to the present invention located on one of the major surfaces of the substrate 1. Optical diffuser material 3 is provided in the openings of the dark mesh pattern 2 on substrate 1. A polarizer 4 is applied to the other major and opposite surface of the substrate 1. Liquid crystal display tiles 5 are adhesively bonded to the cover plate adjacent the dark mesh material 2. The present invention in this embodiment addresses the problem of air entrapment identified as D at the interface between the dark mesh material 2 and liquid crystal display tiles 5.

Figure 5:
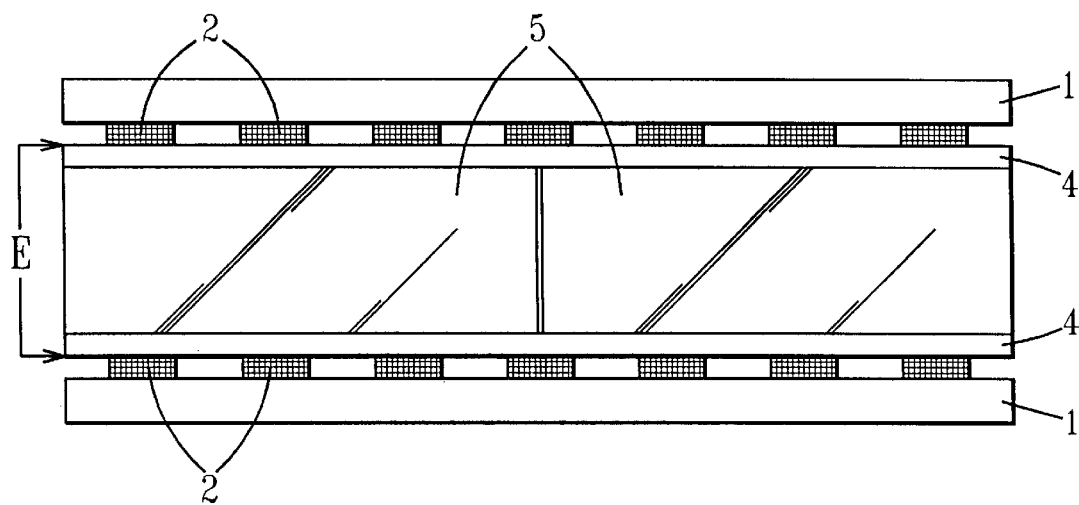
FIG. 5 is a schematic diagram of a tiled liquid crystal display employing both a cover plate and dark mesh material of the present invention and back plate and dark mesh material of the present invention.

FIG. 5 illustrates an embodiment of the present invention employing the plate of the present invention as a cover plate and as a back plate where there is shown a cross-section of the transparent substrate 1 and the dark mesh material 2 according to the present invention. A polarizer 4 is applied on the dark mesh material 2. The present invention in the embodiment addresses the problem of air entrapment identified as E at the interface between the dark mesh 2 and polarizer 4. In this embodiment, diffuser material is not provided in the openings of the mesh material of the cover plate. However, if desired, a diffuser screen can be provided on the structure of the cover plate. The back plate will typically not include diffuser material.

Liquid crystal display tiles 5 are adhesively bonded to the cover plate adjacent polarizer 4 of both the cover plate and the back plate.

It is understood that the present invention also contemplates employing the plate of the present invention as the back plate only or cover plate only and some other structure as the other plate in fabricating liquid crystal display structures.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A plate structure comprising:
   a transparent substrate;
   a dark mesh material on the substrate having a thickness of about 1 to about 30 microns;
   wherein the dark mesh material comprises a photocured photoimageable organic polymeric composition and about 0.01 to about 6 percent by weight of a coloring agent selected from the group consisting of organic dyes, organic pigments and inorganic dyes based upon the total of the polymeric composition and coloring agent; and wherein the dark mesh material has an optical density of about 0.5 to about 3 in the visible light range;
   a polarizing layer; and wherein the photoimageable organic polymeric composition comprises an epoxy resin, cyanate ester or combinations thereof and a polyolefinically unsaturated monomer.

2. The plate structure of claim 1 wherein the coloring agent is black and comprises an organic pigment-chrome complex.

3. The plate structure of claim 1 wherein the thickness of the dark mesh material is about 9 to about 11 microns.

4. The plate structure of claim 1 wherein the optical density of the dark mesh material is about 1.5 to about 2.5 in the visible light range.

5. The plate structure of claim 1 wherein the dark mesh material has a reflectivity of less than 10%.

6. The plate structure of claim 1 wherein the dark mesh material has a reflectivity of less than 7%.

7. The plate structure of claim 1 being a cover plate and which further includes diffuser material in the openings of the dark mesh material.

8. The plate structure of claim 7 wherein the polarizing layer is disposed on the mesh material.

9. The plate structure of claim 8 wherein the dark mesh material is disposed on a first major surface of the transparent substrate and the polarizing layer is disposed on a second major surface of the transparent substrate.

10. The plate structure of claim 1 wherein the polarizing layer is disposed on the mesh material.

11. The plate structure of claim 1 wherein the dark mesh material is disposed on a first major surface of the transparent substrate and the polarizing layer is disposed on a second major surface of the transparent substrate.

12. A liquid crystal display structure which comprises at least one liquid crystal display tile bonded to the plate of claim 1.

13. A liquid crystal display structure which comprises a plurality of liquid crystal display tiles bonded to the plate of claim 1.

14. A method for fabricating a plate which comprises applying a photoimageable composition to a transparent substrate at a thickness of about 1 to about 30 microns wherein the photoimageable composition comprises an organic polymeric composition and about 0.01 to about 6 percent by weight of a coloring agent selected from the group consisting of organic dyes, organic pigments and inorganic dyes based upon the total of the polymeric composition and coloring agent; and wherein the composition has an optical density of about 0.5 to about 3 in the visible light range;
   exposing the composition to actinic radiation and developing to provide a mesh structure; and placing a polarizer on the structure; and
   wherein the photoimageable organic polymeric composition comprises an epoxy resin, cyanate ester or combinations thereof and a polyolefinically unsaturated monomer.

15. The method of claim 14 wherein the photoimageable composition is applied by screen printing.

16. The method of claim 14 wherein the polarizer is laminated to the mesh structure.

17. The method of claim 14 wherein the coloring agent is black and comprises an organic pigment-chrome complex.

18. The method of claim 14 wherein the thickness of the dark mesh material is about 9 to about 11 microns.

19. The method of claim 14 wherein the optical density of the dark mesh material is about 1.5 to about 2.5 in the visible light range.

20. The method of claim 14 wherein the dark mesh material has a reflectivity of less than 10%.

21. The method of claim 14 wherein the dark mesh material has a reflectivity of less than 7%.

22. The method of claim 14 which further includes filling openings in the mesh structure with an optical diffuser material to provide a cover plate.

23. The method of claim 22 wherein the polarizer is placed on the mesh structure.

24. The method of claim 22 wherein the dark mesh material is applied to a first major surface of the transparent substrate and the polarizing layer is displaced on a second major surface of the transparent substrate.

25. A method for fabricating liquid crystal display structure which comprises fabricating a plate which comprises applying a photoimageable composition to a transparent substrate at a thickness of about 1 to about 30 microns wherein the photoimageable composition comprises an organic polymeric composition and about 0.01 to about 6 percent by weight of a coloring agent selected from the group consisting of organic dyes, organic pigments and inorganic dyes based upon the total of the polymeric composition and coloring agent; and wherein the composition has an optical density of about 0.5 to about 3 in the visible light range;

exposing the composition to actinic radiation and developing to provide a mesh structure;

placing a polarizer on the structure; and wherein the photoimageable organic polymeric composition comprises an epoxy resin, cyanate ester or combinations thereof and a polyolefinically unsaturated monomer;

and bonding at least one liquid crystal display tile to the plate.

26. The method of claim 25 which comprises bonding a plurality of liquid crystal tiles to the plate.

* * * * *